United States Patent
Cass et al.

(10) Patent No.: US 7,108,497 B2
(45) Date of Patent: Sep. 19, 2006

(54) INTERCHANGEABLE BLOW MOLD PARISON CLOSING APPARATUS

(75) Inventors: Martin Cass, Port Clinton, OH (US); Shawn L. Overmyer, Fremont, OH (US)

(73) Assignee: Omnimold, LLC, Chagrin Falls, OH (US)

( * ) Notice: Subject to any disclaimer, the term of this patent is extended or adjusted under 35 U.S.C. 154(b) by 433 days.

(21) Appl. No.: 10/707,784

(22) Filed: Jan. 12, 2004

(65) Prior Publication Data

US 2005/0153008 A1    Jul. 14, 2005

(51) Int. Cl.
*B29C 49/42* (2006.01)

(52) U.S. Cl. .................. 425/182; 29/428; 425/532

(58) Field of Classification Search ............... 425/182, 425/522, 528, 532; 264/39; 29/428
See application file for complete search history.

(56) References Cited

U.S. PATENT DOCUMENTS 3,311,684 A * 3/1967 Heider ..................... 264/520
3,339,232 A * 9/1967 Battenfeld et al. ......... 425/235
5,399,302 A * 3/1995 Noguchi et al. ........... 264/412

* cited by examiner

Primary Examiner—Robert B. Davis
(74) Attorney, Agent, or Firm—Calfee, Halter, & Griswold LLP

(57) ABSTRACT

The invention provides a blow mold parison closing apparatus having actuators which are interchangeable. The closing apparatus includes an attachment block having a cylinder body mount and holder/guide support, a pinch bar spaced apart from the attachment block, the pinch bar having a cylinder piston mount and holder/guide mount. The closing apparatus also includes a holder/guide slidingly supported by the attachment block and coupled to the pinch bar. The holder/guide is configured to hold a spring between the pinch bar and attachment block and guide the motion of the pinch bar relative to the attachment block. In operation relative motion between said attachment block and pinch bar may be controlled by either a spring or a cylinder each being easily interchangeable.

11 Claims, 6 Drawing Sheets

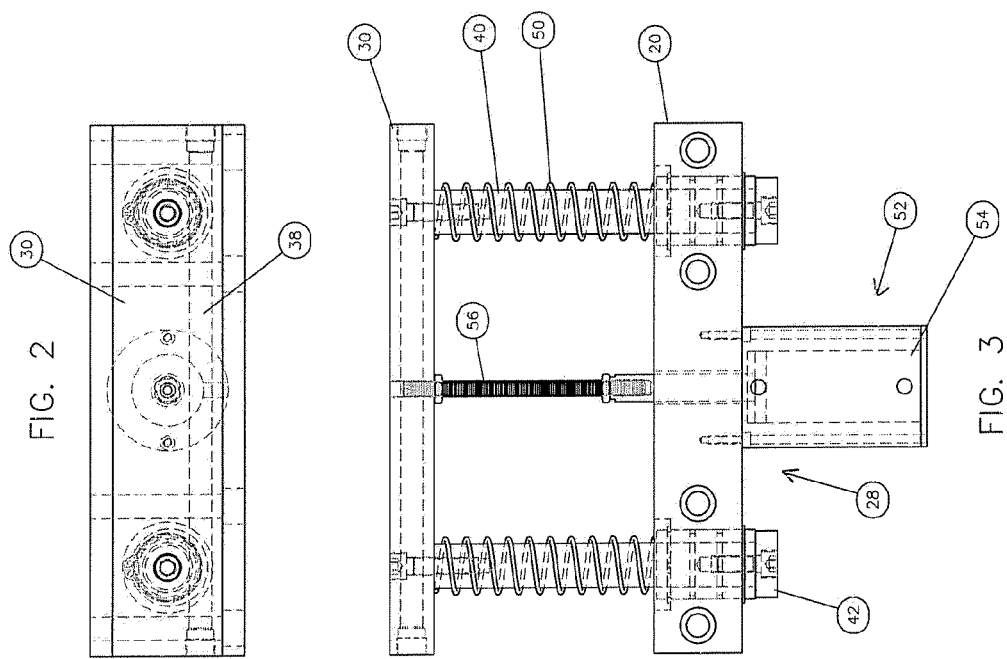
FIG. 2
FIG. 3
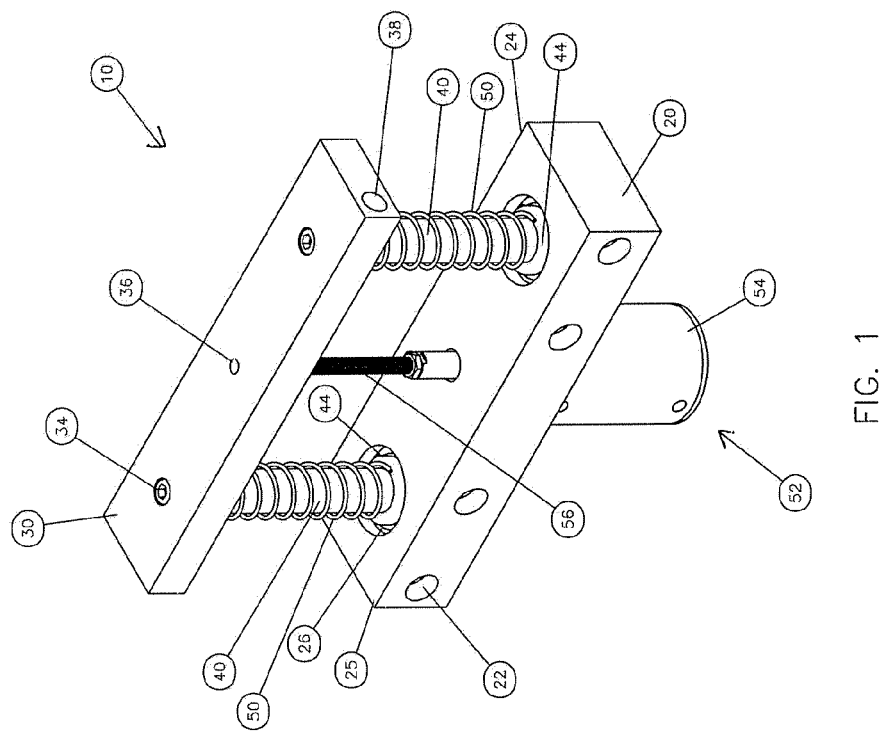
FIG. 1

INTERCHANGEABLE BLOW MOLD PARISON CLOSING APPARATUS

BACKGROUND OF INVENTION

This invention relates generally to blow molds and more particularly to a parison closing or "pinch" apparatus having interchangeable actuation components.

In the process of blow molding, a parison which is similar to an empty balloon is inflated into the constraints of two mold halves. The parison is created as a continuous or interrupted extrusion. Some amount of air is continuously being blown into parison prior to closing the mold. The bottom section of the parison is sometimes closed prior to the mold closing over the parison. This allows the parison to be partially inflated prior to closure of the mold. After the mold is closed, the continuous or interrupted parison is effectively cut off into a single piece section. A common way to seal the lower end of the parison is to first introduce the parison into a space between the two mold halves when they are separated. Then two parison closing or "pinch" apparatus close upon the lower edge of the parison prior to the mold halves fully closing together. The closing apparatus may be provided as part of the mold, a separate assembly that is moved from machine to machine or is part of a blow mold machine.

The pinch apparatus is typically actuated by either springs or by a pneumatic cylinder. Using a spring actuated apparatus, pinch bars upon the pinch apparatus begin in an extended position and then sandwich the lower parison end as the mold starts to be closed. Then the pinch bars are pushed against each other and further retracted as the mold is brought together. The closing of the mold overcomes the force inherent in the springs. As the mold is opened, the springs force the pinch bars back into an extended position. In a version using a cylinder the cylinder pushes the pinch bar back into position, both directions (as opposed to only one direction with a spring) of motion of the pinch bar may be controlled. This can help optimize the partial inflation of the parison prior to the mold closing. However, often a particular mold can function with only one type of pinch apparatus. The pneumatic supply and control components which are part of the mold setup are often completely utilized by components of the mold itself. As a result no pneumatic components are available for the pinch apparatus. If the user does not own a spring actuated pinch apparatus, a completely new pinch apparatus must be purchased. A universal pinch apparatus is desired which may be quickly and easily retrofitted from spring actuation to cylinder actuation or vise versa without changing the other components of the pinch apparatus.

SUMMARY OF INVENTION

The present invention is directed to a blow mold parison closing apparatus which may be quickly and easily retrofitted from spring actuation to cylinder actuation. In one embodiment of the invention the closing apparatus includes an attachment block which has a cylinder body mount and a holder/guide support. The closing apparatus also includes a pinch bar which is spaced apart from the attachment block. The pinch bar includes a cylinder piston mount and a holder/guide mount. In one embodiment of the invention, at least two holder/guides are slidingly supported by the attachment block and coupled to the pinch bar. Each holder/guide guides the motion of the pinch bar relative to the attachment block. The holder guides are able to hold a spring between the pinch bar and attachment block. Thus, by detaching the pinch bar from a holder/guide, a spring may be placed or removed from around the holder/guide. If the spring is removed, a cylinder may be easily mounted to the attachment block. The cylinder may be coupled to the pinch bar after the pinch bar has been replaced. If the spring is put in place for use, the cylinder may be easily removed from the attachment block and pinch bar. Thus, depending on what means of actuation is required, the closing apparatus may be easily retrofitted.

These and other features, aspects and advantages of the present invention will become better understood with regard to the following description, appended claims, and accompanying drawings.

BRIEF DESCRIPTION OF DRAWINGS

FIG. 1 is a perspective view of a closing apparatus having two separate means of actuation attached;

FIG. 2 is a top view of the closing apparatus having both means of actuation attached;

FIG. 3 is a cross sectional view of the closing apparatus having both means of actuation attached;

DETAILED DESCRIPTION

Figure 7:
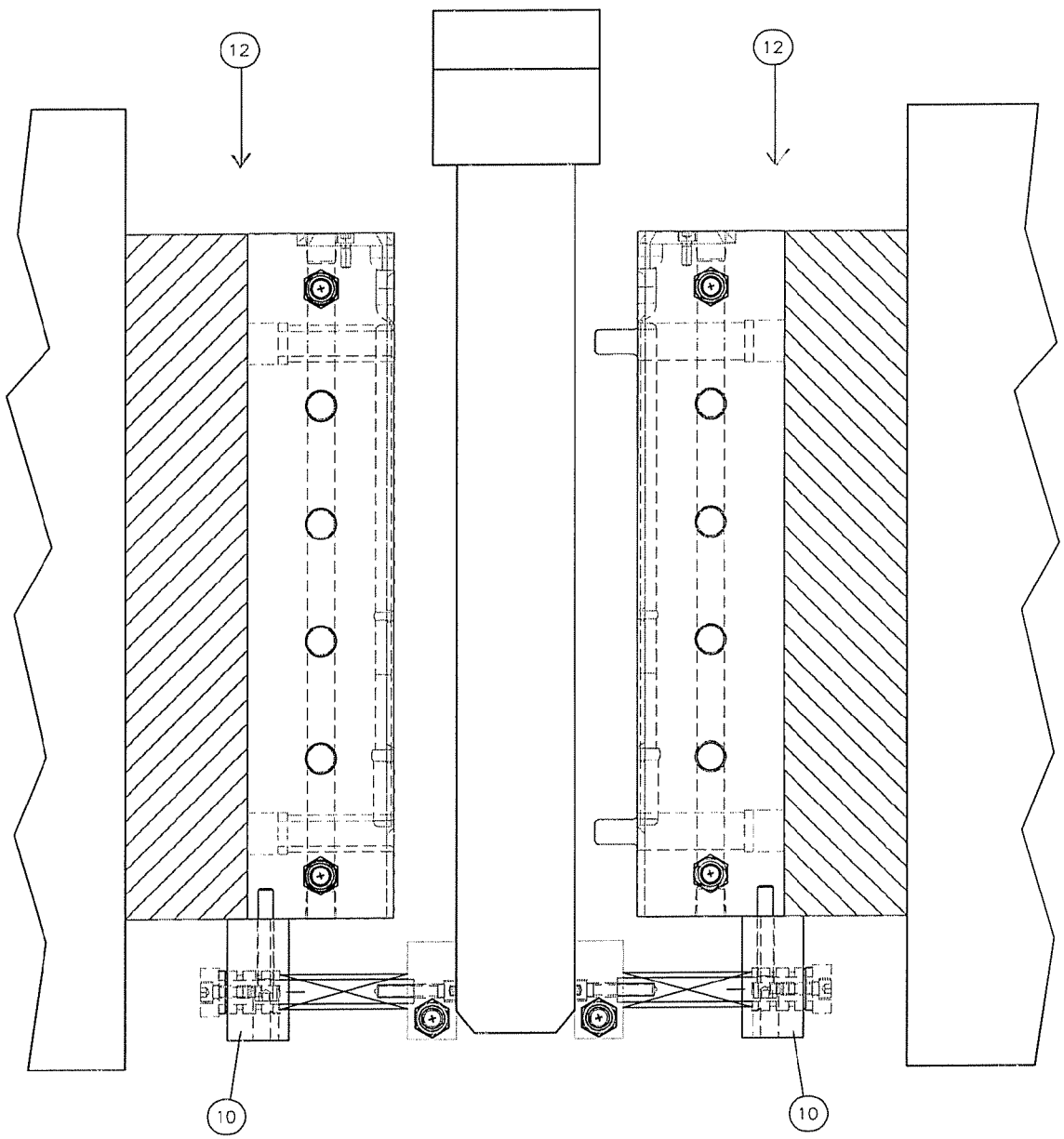
FIG. 7 is a sectional view of a mold and closing apparatus.
Figure 9:
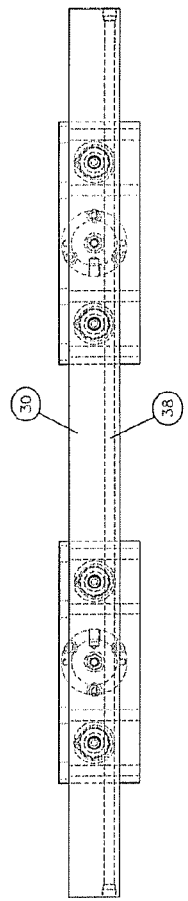
FIG. 9 is a top view of the closing apparatus utilizing multiple cylinder actuation.
Figure 10:
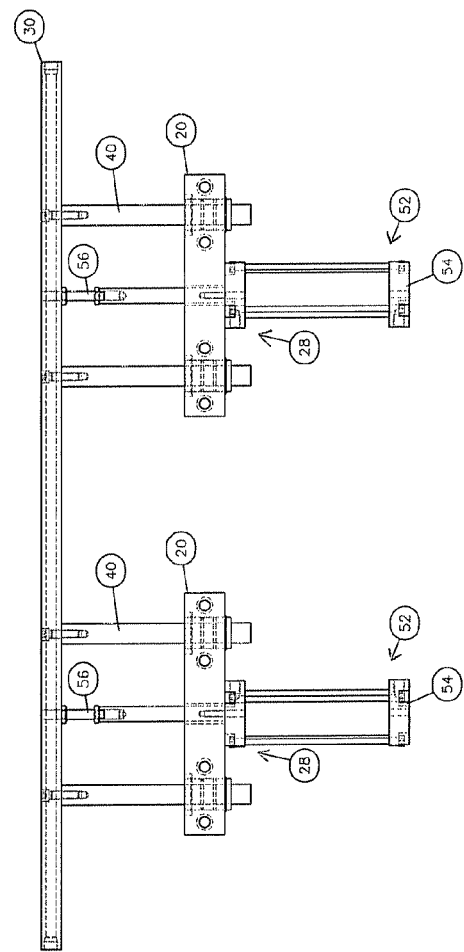
FIG. 10 is a side view of the closing apparatus utilizing multiple cylinder actuation.

Referring to FIG. 1, a schematic view of a blow mold parison closing apparatus 10 is shown. As described in more detail below the closing apparatus 10 comprises an attachment block 20, pinch bar 30, holder/guide(s) 40, as well as mounts for cylinders and spring supports. The invention provides the advantage of being easily retrofitted from one means of actuation to another. Springs 50 may be quickly removed and replaced with a cylinder 52. In a similar fashion, a cylinder 52 may be removed and replaced with springs 50. Thus, the appropriate closing apparatus configuration may be used which meets the requirements of the mold and other components being used. FIG. 7 shows the closing apparatus 10 being used in conjunction with mold halves 12.

Referring back to FIG. 1 the closing apparatus 10 is shown with springs 50 and a cylinder 52 attached. This is illustrative of the ways the apparatus may be set up. However, it is not common for both actuating components to be used at the same time with the closing apparatus 10. The attachment block 20 is shown having a rectangular shape, but in fact may have any shape. The attachment block is preferably made from aluminum or steel. The attachment block 20 may have a size which is similar to, but slightly larger than the pinch bar 30. The attachment block 20 is shown including a number of apertures 22 upon a mounting face 24 which pass through the attachment block 20 and through which bolts may be inserted to affix the attachment block 20 to a mold 12. The bolts that hold the attachment blocks to the mold are large enough to absorb the sheer pressure applied. Steel thread inserts may also be installed into the mold where the bolts attached for added strength. The attachment block 20 further defines two apertures 26 upon a face 25 adjacent to the mounting face 24. These apertures 26 may pass through the attachment block 20. The apertures 26 act as supports for the holder/guides 40. Each aperture 26 may support a bearing 44 which in turn support holder/guides 40. The bearing 44 allows the holder/guide 40 to slide through the aperture 26 and attachment block 20. The bearings 44 are easily replaceable. The attachment block 20 mounts to and moves along with the motion of the mold 12.

As seen in FIG. 3 the attachment block 20 also includes a mount 28 for a cylinder 52. The mount 28 includes apertures for bolts, screws or other known fasteners to hold the cylinder body 54 in place. Preferably, two screws passing through the length of the cylinder body 54 connect to the attachment block 20. The mount 28 may also include an aperture through the attachment block 20 to allow passage of the cylinder piston 56.

Figure 4:
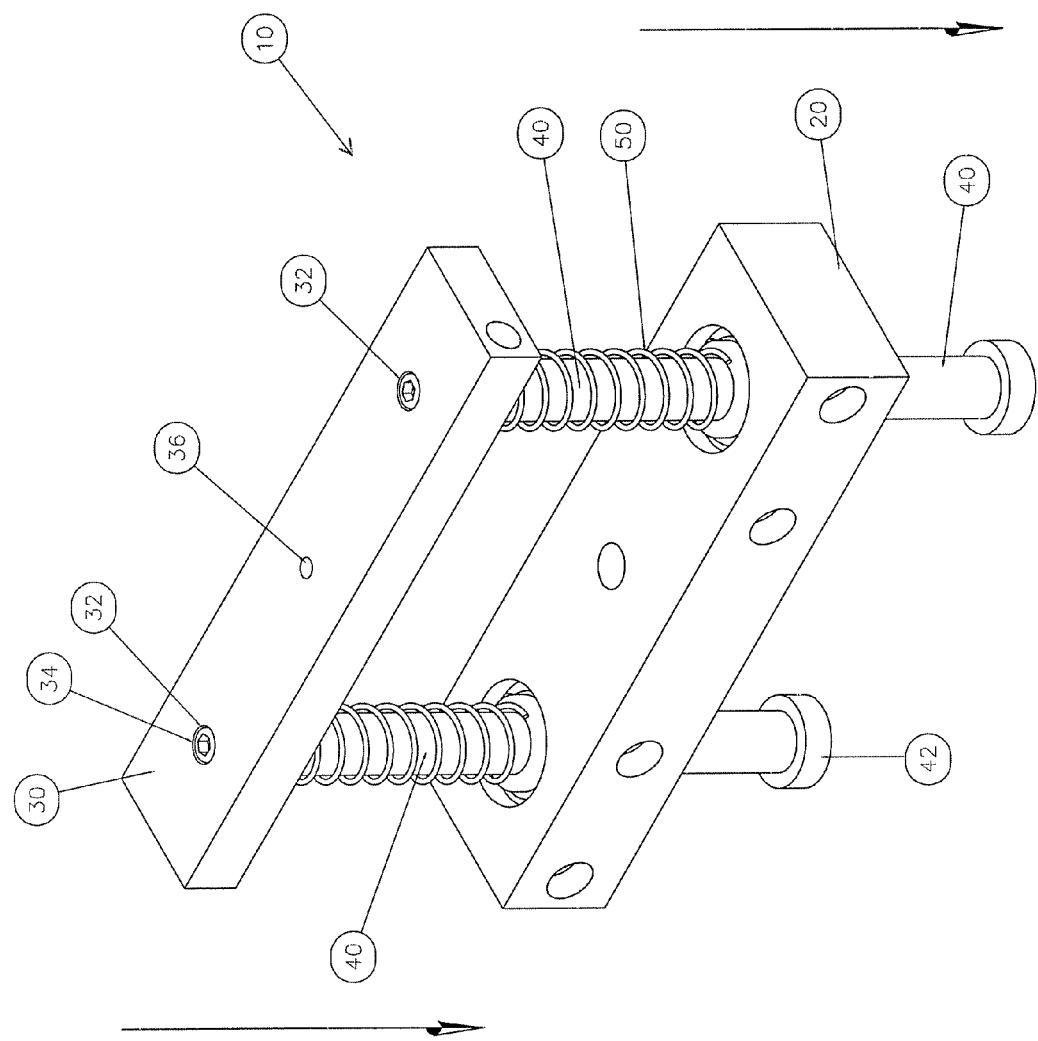
FIG. 4 is a perspective view of the closing apparatus utilizing spring actuation.

A holder/guide 40 is supported by the attachment block 20 on one end and is coupled to the pinch bar 30 on an opposite end. The holder/guide 40 functions as a holder for a spring 50 and as a guide for the movement of the pinch bar 30. The pinch bar 30 may be not allowed to move outside of a prescribed plane. The holder/guide 40 is preferably manufactured from rod steel, but may be made from any strong material that will not break under pressure. As shown in FIG. 4, as the pinch bar 30 is pushed towards the attachment block 20, the holder/guide 40 slides and is extended through the attachment block 20. The holder/guide 40 is coupled simply to the pinch bar 30 using bolts or screws. The holder/guide 40 is used whether or not the springs 50 are required with the closing apparatus 10. If the springs 50 have been removed, the holder/guide 40 acts solely as a guide. At an end opposite to the pinch bar 30 the holder/guide 40 may be affixed to an end cap 42 using a screw. The end cap 42 restricts motion of the holder/guide 40 and pinch bar 30 as the pinch bar 30 moves away from the attachment block 20. In a situation where maximum strength is not required, a telescoping holder/guide may be used. This holder/guide minimizes space usage and collapses upon itself rather then passing through the attachment block, thus negating the need for a bearing.

In a preferred embodiment of the invention, two holder/guides 40 are used on each closing apparatus 10. However, any number of holder/guides 40 may be used as long as the weight across the face of the pinch bar 30 is distributed evenly. Additionally, the proper number of holder/guides 40 minimize wear upon the holder/guides 40.

The pinch bar 30 may be formed from steel or any other material The pinch bar 30 may be any size, but typically has a length in a range from about 30.5 to about 70 centimeters (12 to 24 inches). In a preferred embodiment of the invention the pinch bar has a width of about 6.35 centimeters (2.5 inches) and a thickness of about 2.5 centimeters (one inch). The pinch bar 30 functions to contact and close the bottom of the parison prior to the mold contacting the parison. The pinch bar 30 includes a mount 32 for one end of the holder/guides 40. The mount 32 may be an aperture through which a mounting screw 34 may pass. The pinch bar 30 is attached to the holder/guides 40 in a manner which allows an easy release. Additionally, the pinch bar 30 includes a cylinder piston mount 36 which may be an aperture. The aperture may be threaded and the cylinder piston 56 screwed into the aperture. Alternatively, a screw may connect the pinch bar 30 to the cylinder piston 56. If a cylinder 52 is in use to actuate the closing apparatus 10, the pinch bar 30 is coupled to the cylinder piston 56. If instead springs 50 are being used, the pinch bar 30 abuts against one end of each spring 50 which is opposite from the end contacting the attachment block 20 or bearing 26 supported by the attachment block 20. The pinch bar 30 is spaced apart from and oriented similarly to the orientation of the attachment block 20. Referring to FIG. 2, the pinch bar 30 may also include a cooling passage 38 through which a fluid may be circulated to cool the parison.

Figure 5:
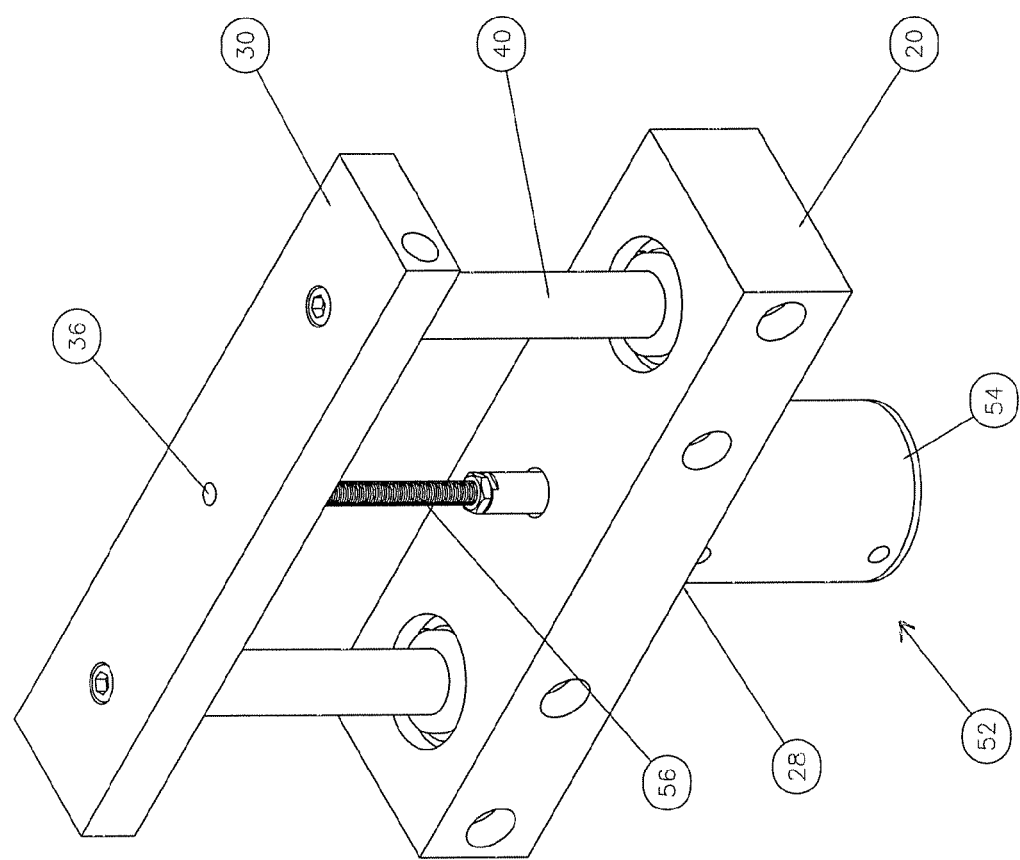
FIG. 5 is a perspective view of the closing apparatus utilizing cylinder actuation.
Figure 8:
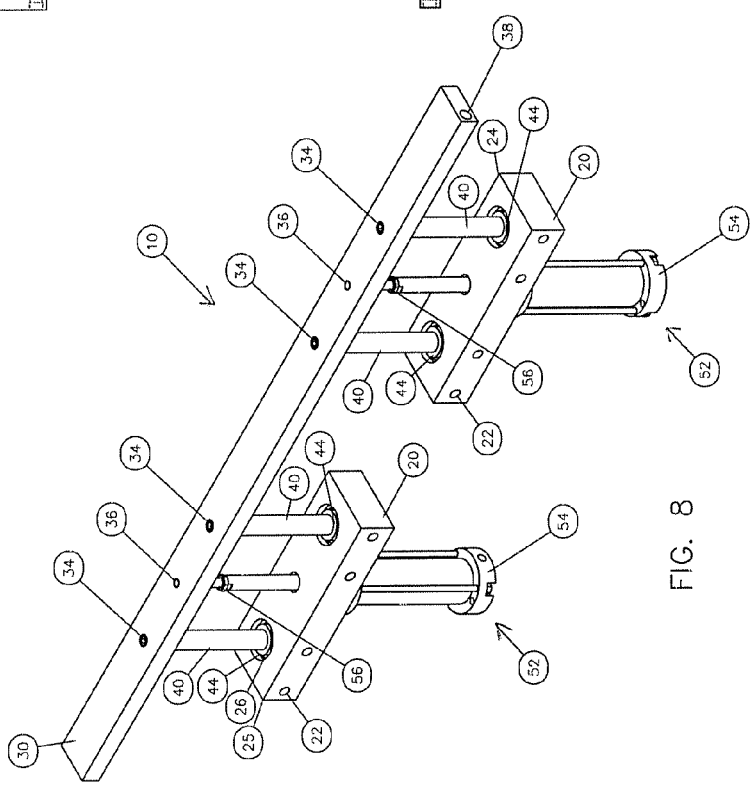
FIG. 8 is a perspective view of a closing apparatus utilizing multiple cylinder actuation.

FIG. 4 shows the closing apparatus 10 configured with springs 50 to actuate motion. The springs 50 are held around the holder/guide 40 between the pinch bar 30 and attachment block 20. Arrows depict motion of the pinch bar 30 as the mold halves are brought together and the spring 50 compressed. The compressed spring 50 would then push the pinch bar 30 away from the attachment block 20 when the mold is released. The strength of the spring 50 varies and is determined by the size and weight of the pinch bar 30 being used. Additionally, the size and thickness of the parison also determines how the springs 50 will be sized. FIG. 5 shows the closing apparatus 10 configured with a cylinder 52 to actuate motion. The springs 50 have been removed. The cylinder 52 may be either a hydraulic or pneumatic cylinder. A hydraulic cylinder may be used in conjunction with especially thick parisons. The cylinder body 54 is attached to the mount 28 upon the attachment block 20. The cylinder piston 56 is coupled to the pinch bar 30 using a screw or via mating threads. Upon actuation of the cylinder 52 the pinch bar 30 may be moved closer to or away from the attachment block 20. As movement occurs, the holder/guide 40 guides the motion of the pinch bar 30. As shown in FIG. 8, a closing apparatus 10 having multiple cylinders 52 may also be used. The number of cylinders 52 and holder/guides 40 used is determined by the size and thickness of the parison being expanded. A larger parison requires a larger pinch bar 30 which in turn required extra cylinders 50 or springs to provide evenly controlled movement.

Figure 6:
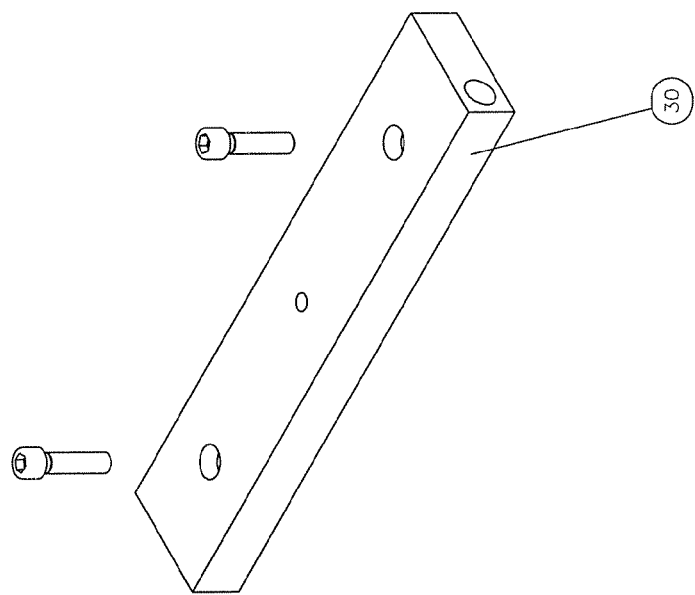
FIG. 6 is a perspective view of the closing apparatus during a retrofit from spring actuation to cylinder actuation.
Figure 6:
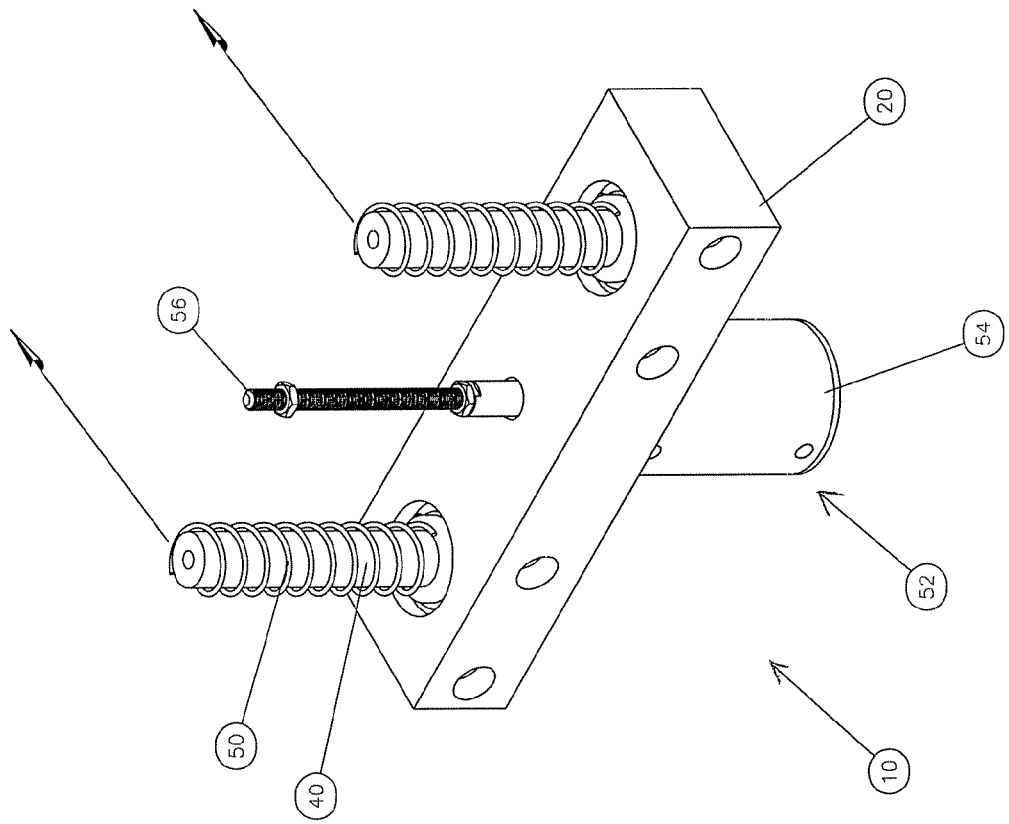

FIG. 6 shows the process of retrofitting the closing apparatus 10. The apparatus 10 is initially fitted with springs 50 to actuate the pinch bar 30. When it is realized that in order to meet the requirements of a new mold a cylinder actuated closing apparatus 10 is required the following steps may be taken. The pinch bar 30 may be removed from the closing apparatus 10 by removing each screw or equivalent fastener which is attached to each holder/guide 40. The pinch bar 30 may then be displaced from the closing apparatus 10. After the pinch bar 30 is removed, the springs 50 may be easily slid off of the holder/guides 40 and put aside for later use. At any time during the retrofit process the cylinder 52 may be affixed to the closing apparatus 10. First the cylinder body 54 may be attached to the attachment block mount 28 using screws or equivalent fasteners. After the springs 50 have been removed from the closing apparatus 10, the pinch bar 30 may be placed back into position. The screws which couple the pinch bar 30 to the holder/guides 40 may be replaced. Additionally, a screw may be inserted to hold the cylinder piston 56 to the piston mount 36 of the pinch bar 30, or the two parts may be directly screwed together using mating threads. Alternatively, the pinch bar 30 may be put back into place before the cylinder 52 is mounted upon the attachment block 20.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents. Use of the term "or" herein is the inclusive, and not the exclusive use.

The invention claimed is:

1. A blow mold parison closing apparatus comprising:
   an attachment block having a cylinder body mount and holder/guide support;
   a pinch bar spaced apart from said attachment block, said pinch bar having a cylinder piston mount and holder/guide mount; and
   a holder/guide slidingly supported by said attachment block and coupled to said pinch bar, said holder/guide configured to hold a spring between said pinch bar and attachment block and guide the motion of said pinch bar relative to said attachment block whereby relative motion between said attachment block and pinch bar may be controlled by either a spring or a cylinder each easily interchangeable from said closing apparatus.

2. The blow mold parison closing apparatus of claim 1 including a cylinder having a body and piston, said body attached to said attachment block and said piston attached to said pinch bar.

3. The blow mold parison closing apparatus of claim 1 including a spring disposed around said holder/guide and between said attachment block and pinch bar.

4. The blow mold parison closing apparatus of claim 1 including at least two holder/guides slidingly supported by said attachment block and coupled to said pinch bar.

5. The blow mold parison closing apparatus of claim 4 including a spring disposed around each holder/guide.

6. The blow mold parison closing apparatus of claim 1 further including a bearing supported by the attachment block, said bearing supporting said holder/guide.

7. The blow mold parison closing apparatus of claim 2 including a second cylinder having a body and piston, said body attached to said attachment block and said piston attached to said pinch bar.

8. A blow mold comprising:
   first and second mold halves;
   a parison closing apparatus including:
   an attachment block having a cylinder body mount and holder/guide support;
   a pinch bar spaced apart from said attachment block, said pinch bar having a cylinder piston mount and holder/guide mount; and
   a holder/guide slidingly supported by said attachment block and coupled to said pinch bar, said holder/guide configured to hold a spring between said pinch bar and attachment block and guide the motion of said pinch bar relative to said attachment block whereby relative motion between said attachment block and pinch bar may be controlled by either a spring or a cylinder each easily interchangeable from said closing apparatus.

9. The blow mold of claim 8 including two parison closing apparatus, the first parison closing apparatus affixed to said first mold half and the second parison closing apparatus affixed to said second mold half.

10. A method of retrofitting actuators upon a blow mold parison closing apparatus comprising the steps of:
    detaching a pinch bar from a holder/guide, said holder/guide being slidingly supported by an attachment block;
    removing a spring from around said holder guide;
    attaching a cylinder to said attachment block; and
    reattaching said pinch bar to said holder/guide.

11. The method of claim 10 wherein said cylinder includes a piston and further including the step of attaching said cylinder piston to said pinch bar.

* * * * *